(12) United States Patent
Yokomizo

(10) Patent No.: US 7,194,703 B2
(45) Date of Patent: Mar. 20, 2007

(54) SYSTEM AND METHOD FOR CREATING SCREEN SAVER

(75) Inventor: Yoshikazu Yokomizo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 871 days.

(21) Appl. No.: 10/449,624

(22) Filed: May 30, 2003

(65) Prior Publication Data

US 2003/0227493 A1     Dec. 11, 2003

(30) Foreign Application Priority Data

Jun. 5, 2002    (JP)    .............................. 2002/164074

(51) Int. Cl.
*G06F 3/00*     (2006.01)
*G06F 17/00*    (2006.01)
*G06F 15/00*    (2006.01)
*H04N 9/74*     (2006.01)

(52) U.S. Cl. ................... 715/867; 715/501.1; 715/526; 348/586

(58) Field of Classification Search ................. 715/867
See application file for complete search history.

(56) References Cited

U.S. PATENT DOCUMENTS

| 6,288,753 | B1 * | 9/2001  | DeNicola et al. | 348/586 |
| 6,317,115 | B1   | 11/2001 | Yokomizo        | 345/123 |
| 6,433,784 | B1 * | 8/2002  | Merrick et al.  | 345/473 |
| 6,920,606 | B1 * | 7/2005  | Jablonski et al.| 715/501.1 |

* cited by examiner

*Primary Examiner*—Weilun Lo
*Assistant Examiner*—Jordany Nunez
(74) *Attorney, Agent, or Firm*—Fitzpatrick, Cella, Harper & Scinto

(57) ABSTRACT

A system for creating screen savers based on video images is provided. An object image that may move around in a video image is separated from backgrounds. An MPEG-4 file of the video image is created and stored in a computer. The MPEG-4 file is uploaded from the computer to a server connected to the computer through a network. The server detects motions of the object image in the MPEG-4 file, creates a screen saver based on the detected motions, and stores the screen saver. The computer may download the screen saver stored in the server and install the screen saver on the computer, and displays the video image as the screen saver on a screen.

15 Claims, 14 Drawing Sheets

SYSTEM AND METHOD FOR CREATING SCREEN SAVER

BACKGROUND OF THE INVENTION

1. Field of the Invention

The present invention relates to systems and methods for creating screen savers based on video images.

2. Related Background Art

The function of a screen saver is, as its name indicates, to reduce power consumption of a display device, which may be connected to a personal computer, by dimming out the screen of the display device when the personal computer is not in use, and to prevent baking of the screen. If the screen is completely darkened to reduce the power consumption, the user does not know whether or not the personal computer is powered on. Accordingly, a function of the screen saver is activated such that images and/or characters having a smaller area than the area of the entire screen are normally moved and displayed on the screen to indicate that the personal computer is powered on.

In recent years, the performance of personal computers has substantially improved, and many of them are capable of displaying computer graphics (CG) images over the entire screen as screen savers, for example, a graphic image that looks like a real fish tank of an aquarium. Such CG images may be excessive when serving as screen savers whose fundamental object is to prevent baking of the screen.

Many of the screen savers in recent years successively move objects drawn in 2-D or 3-D graphics. Also, screen savers that reproduce moving images are appearing. For example, a scene where a pet animal such as a dog or a cat is running around in a park may be captured by a video camera, and the photographed moving image itself can be used as a material of a screen saver.

However, in the past, specialized knowledge and/or capability as a software programmer are required to create screen savers based on video images captured by an individual. In other words, a highly skilled technique is required, and therefore it is not easy for individuals without such a highly skilled technique or knowledge (e.g., amateurs) to create screen savers using moving images.

Also, for example, when a screen saver is created using a video image of a moving object such as an animal in a park, which may be captured by a video camera, as a material for the screen saver, a background of the image may be eliminated. In this case, the created moving image in the screen saver looks as if the photographed animal is held in one spot, and the animal is merely moving their legs in that spot. This is because people who takes a moving image usually zooms up an animal (his/her pet in particular) to fit in generally the entire screen of a video camera, and pans the camera to follow the movements of the animal.

To avoid this phenomenon, the video camera may be fixed on a tri-pod, and a wide-angle lens is set on the video camera, such that a substantially large area of the park is captured while the animal is moving around in that large area. However, by setting the video camera in this way, it becomes difficult to see the details of the animal (e.g., facial expression of the animal) in the captured video image due to the limitation of resolution of the video camera.

SUMMARY OF THE INVENTION

In view of the above, the present invention relates to systems and methods that make it easy for individuals to create screen savers based on captured video images, using contents, such as, people, animals and the like in the video images, without having to perform complicated steps of creating screen savers.

Also, the present invention relates to systems and methods for creating screen savers based on video images, which move the position of an object captured in a video image according to actual movements of the object within a screen saver created. Accordingly, for example, even when an individual captures a video image of an animal that may be walking around, zoomed up to a size that fills in almost the entire screen, and the video camera is panned to follow the movements of the animal, the created screen saver can avoid artificial presentation of the animal in which the animal appears to be staying in one spot, and merely moving its front and rear legs.

In accordance with an embodiment of the present invention, a system for creating screen savers based on a video image includes: a first transmission unit that transmits the video image, an image separation unit that receives the video image transmitted and separates an object image from the video image received, a screen saver creating unit that creates a screen saver using the object image separated as contents, a second transmission unit that transmits the screen saver created, and a start unit that receives and starts the screen saver transmitted.

In accordance with another embodiment of the present invention, a method for creating screen savers based on a video image includes: a first transmission step of transmitting the video image, an image separation step of receiving the video image transmitted and separating an object image from the video image received, a screen saver creating step of creating a screen saver using the object image separated as contents, a second transmission step of transmitting the screen saver created, and a start step of receiving and starting the screen saver transmitted.

In accordance with still another embodiment of the present invention, a method for creating screen savers based on multimedia material including at least one video image, the method including: a preserving step of preserving layout information of the at least one video image placed in a two-dimensional layout; a time controlling step of providing the layout information with changes along a time axis, and controlling and preserving parameters that controls display positions, display modes, and display timings of the multimedia material; an image separation step of separating an object image from the video image; a screen saver creating step of controlling position information along the time axis of the object image separated and superposing the object image with another object to thereby create a screen saver; a transmission step of transmitting the screen saver created; and a start step of receiving and starting the screen saver.

In the present embodiment, the multimedia material may further include a still image and/or a CG graphics. The preserving step may include a step of mixing the video object of the multimedia material with another multimedia object to create layout information in which the multimedia objects mixed are arranged in a two-dimensional layout. Furthermore, the time controlling step may include controlling and preserving a parameter that controls a superposing state among the mixed multimedia materials.

Moreover, in accordance with still another embodiment of the present invention, a system for creating screen savers based on a video image includes: an image separation unit that separates an object image from the video image; a detection unit that detects moving directions of the object image; and a screen saver creating unit that creates a screen saver using the object image as contents based on the object image separated and the moving directions detected.

Other objects, features and advantages of the invention will become apparent from the following detailed description taken in conjunction with the accompanying drawings.

DESCRIPTION OF THE PREFERRED EMBODIMENTS

Preferred embodiments of the present invention will be described below with reference to the accompanying drawings.

[Server-Client System]

Figure 1:
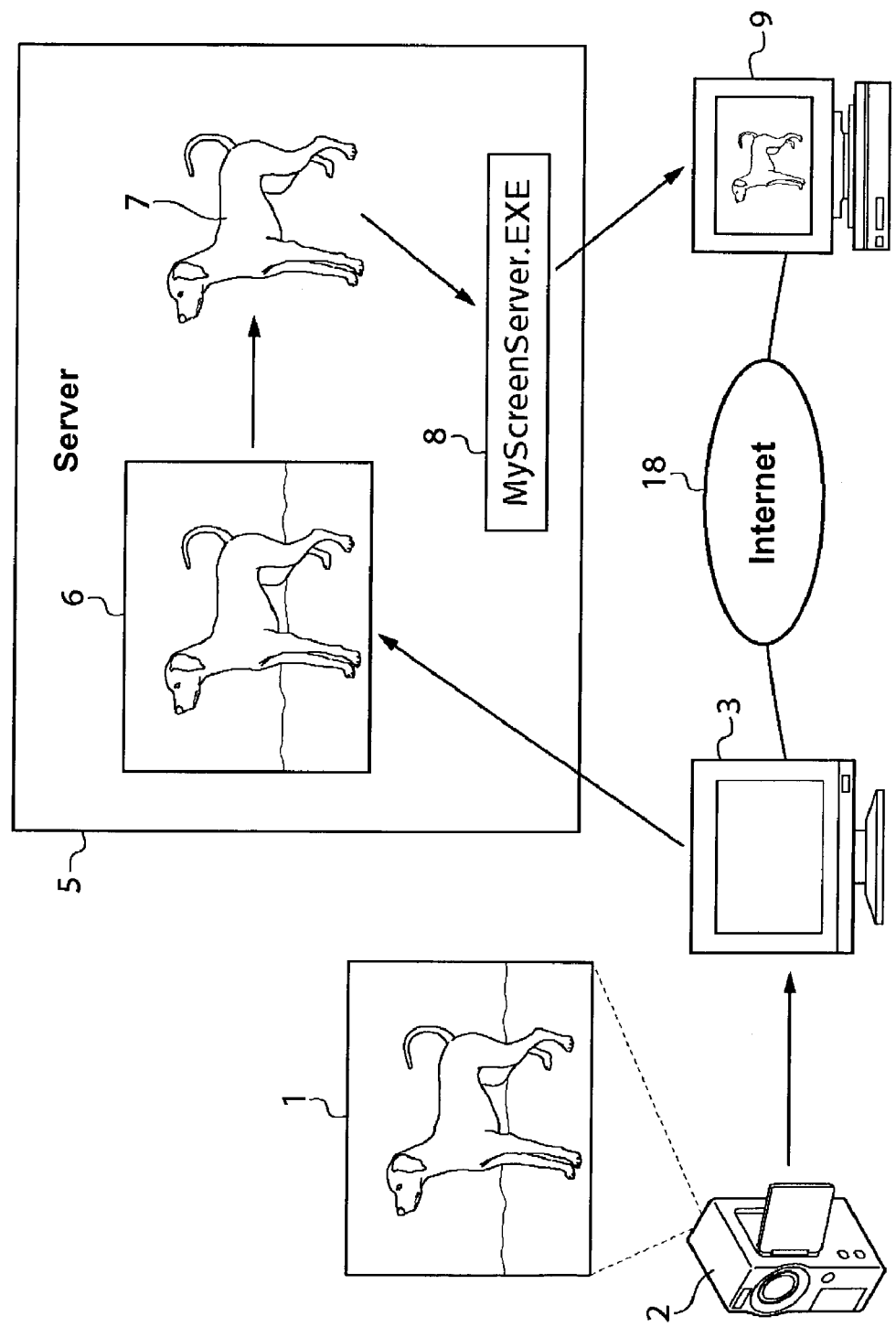
FIG. 1 shows a structure of a system for creating screen savers in accordance with an embodiment of the present invention.

FIG. 1 shows a structure of a system for creating screen savers (hereafter referred to as a "screen saver creating system") in accordance with an embodiment of the present invention. The screen saver creating system of the present embodiment is generally composed of a client-server system in which a server apparatus and a client apparatus are mutually connected through a network such as the Internet.

Referring to FIG. 1, a subject 1, which may be any moving object such as an air plane, people, pet animal, and the like, is photographed by a video camera 2. A computer 3 such as a personal computer takes in a video image captured by the video camera 2, and performs a format conversion of the video image with an MPEG-4 compression algorism depending on the requirements.

Reference numeral 5 denotes a server that has a function to create screen savers. Reference numeral 6 denotes a moving image (i.e., a MPEG-4 file) that is uploaded onto the server 5, and reference numeral 7 denotes a moving image (i.e., a MPEG-4 file) of an object (e.g., a dog in the illustrated embodiment), which is created in making a screen saver that uses the dog as its content. To create the moving image 7, a background portion is erased from the moving image 6, and only a region corresponding to the object is separated. In the present embodiment, only the moving image of the dog without the background image is displayed on the screen to make the moving image to function as a screen saver. Under predetermined conditions, for example, when an inactive state lasts for a predetermined time period while a document is created by a word processor a spreadsheet software, the screen saver is started and the moving image of the object is displayed on the screen. Reference numeral 8 denotes a screen saver application in an executable format (MyScreenSaver.EXE) that is created based on the moving image of the object that is separated. Reference numeral 9 denotes a computer such as a personal computer with which the created screen saver is downloaded and displayed. It is noted that the personal computer 3 and the personal computer 9 may be provided as a single personal computer or as independent personal computers. Reference numeral 18 denotes a communications network such as the Internet through which MPEG-4 files and screen saver applications may be transmitted.

An outline of operations of the screen saver creating system with the structure described above is described below.

The user takes a picture of the subject 1 by the video camera 2. For example, the user takes a picture of his pet dog. The captured video image is inputted as a digital video file in the personal computer 3 through an appropriate interface. In this embodiment, the video file is compressed in the ISO standard MPEG-4 compression format.

The user operates the personal computer 3, and uploads the MPEG-4 file onto the server 5 through an appropriate communications network such as the Internet. The MPEG-4 file 6 uploaded on the server 5 is processed by a processor and a relevant software program on the server 5 such that only the image portion of the dog is separated, and the background image is erased. As a result, the MPEG-4 file 7 containing the separated image of the dog is created. Furthermore, the MPEG-4 file 7 containing the separated image of the dog is converted into an executable screen saver application (MyScreenSaver.EXE shown in FIG. 1) through processing by the processor and relevant software program, and saved in a predetermined section (e.g., a memory device) in the server 5.

When the above operations are completed, the user can use the personal computer 9 to access the server 5, download the screen saver 8 onto the personal computer 9 and install the screen saver 8 on the personal computer 9. After installing the screen saver 8 on the personal computer 9, the user can enjoy the screen saver 8 that shows his/her own pet as its contents on the screen of the personal computer 9.

[Separation Tool]

Figure 2:
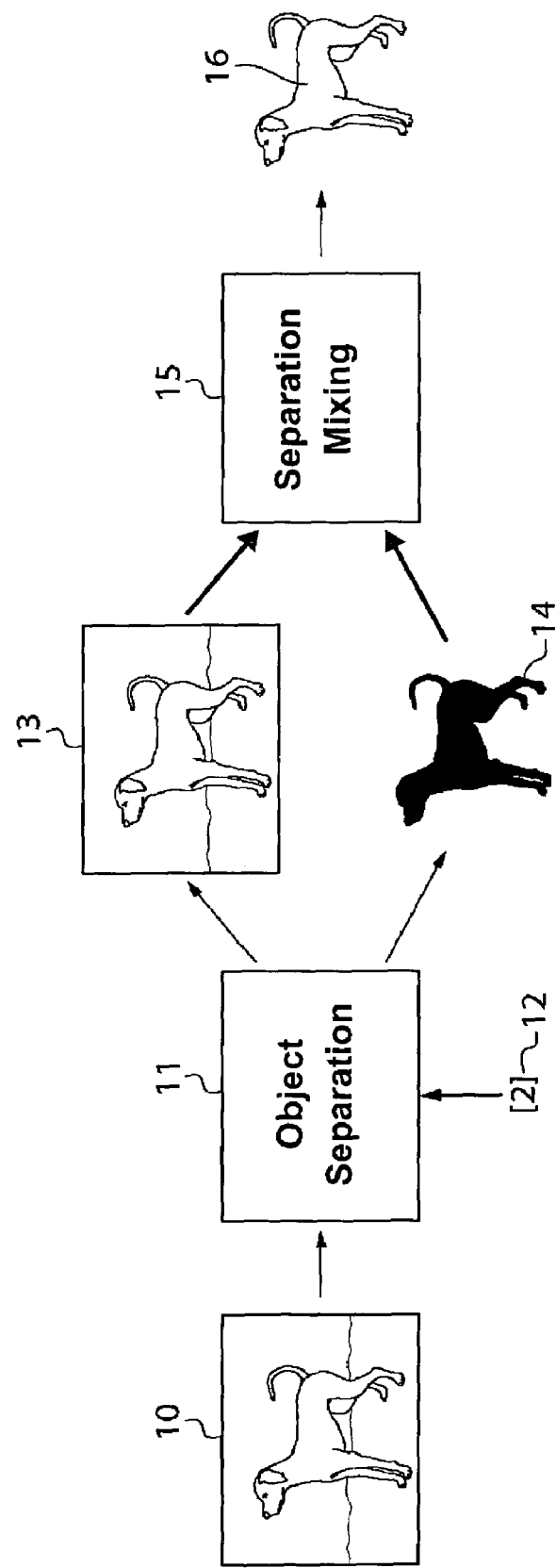
FIG. 2 illustrates an object separation processing.

FIG. 2 illustrates an object separation processing. The illustration shows an inputted digital video image 10 before the separation processing, which corresponds to the moving image (MPEG-4 file) 6 described above; an object separation module 11; a separation procedure selection parameter 12 that is given to the object separation module 11; an original video image for separation 13, which is identical with the video image 10; a mask pattern 14 of the object that is separated; an object(s) mixing module 15; and a video object 16 that has been separated.

The object separation module 11 can provide a plurality of separation methods. An appropriate one of the separation methods is selected by the separation procedure selection parameter 12. For example, when a numerical value "1", "2"

or "3" is given as the object separation module 11, a "blue-back separation method", "optional background separation method" or "manual background separation method" is selected, respectively.

The "blue-back separation method" is selected on the premise that the inputted video image 10 is a moving image of an object (e.g., a pet dog) photographed in a studio with a blue background. In the "blue-back separation method," which is a well known technique, video signals of RGB components are converted into signals of YUV components, and blue components are detected and converted into white of black to thereby retrieve only the object. Drawbacks of the "blue-back separation method" are also well known. For example, in the "blue-back separation method", an especially large sized apparatus is required for taking pictures, and if an object contains blue color portions, a created video object may fail to show portions corresponding to the blue color portions.

In the case of the "optional background separation method", an optional still image (for a background image) that does not contain an object is photographed, a video image of the object is photographed with the same background, and the aforementioned photographed still image (the background image) is subtracted from the video image. As a result, the background portion of the image data becomes nil as noise is ignored, and certain values remain in the image data in an area corresponding to the object portion. These are quantified to values 0 or values 1 to obtain an object mask pattern, and the object mask pattern is multiplied with the original video image to separate the object.

In the case of the "manual separation method", a first frame of a video image containing an object is displayed as a still image, an operator traces the contour of the object in the still image to obtain contour information. By utilizing a video image characteristic in which an object does not substantially shift in adjacent frames, images in an immediately succeeding frame adjacent to the contour information given in the first frame are examined to detect a new contour of the object in the immediately succeeding frame. This operation is successively repeated frame by frame to separate the object from the entire frames. The internal structure of the object separation module 11 may be readily realized by the person skilled in the art, and therefore its detailed explanation is omitted.

The mask pattern 14 outputted from the object separation module 11 is a bitmap image with its object portion being in 1s and its background portion being in 0s. As described above, the bitmap image is multiplied with the original video image to obtain a moving image of the separated object portion.

[Panning]

When capturing images of a pet animal such as a dog or a cat, only a few people may use a wide angle camera lens on a camera and mount the camera on a tripod to capture the animal moving around. Ordinarily, an image of the animal is zoomed in to a size that generally fits to the entire screen, and the camera is panned to follow movements of the animal.

Figure 3:
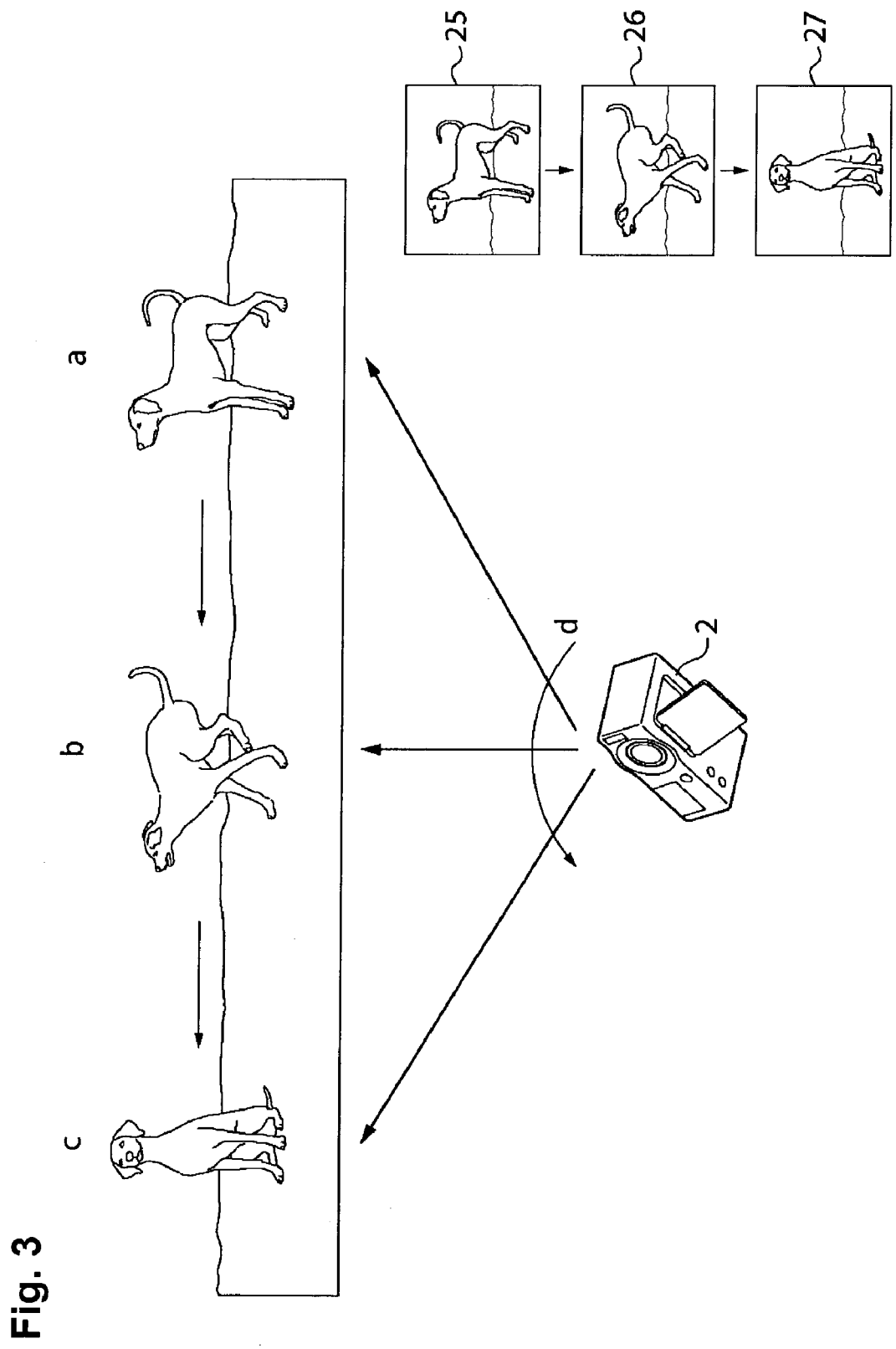
FIG. 3 illustrates a photographing example in a panning operation.

FIG. 3 illustrates a state of imaging in a panning operation. In the figure, when a moving object, a dog in this example, moves from a point a→a point b→a point c, the video camera 2 zooms in the dog to a size that generally fills the entire screen, and is rotated in a direction indicated by an arrow d from right to left to take images. This operation is called "panning" or simply "pan".

As a result of the panning operation, scenes 25, 26 and 27 are sequentially captured. However, as indicated in these scenes 25→26→27, the images captured show that the dog in the scenes is merely moving its legs, and only the backgrounds are moving from left to right. However, such a moving image may not give the viewers a sense of disorder, because the viewers can mentally visualize in their brains movements of the dog in a certain direction based on the relative movements of the background images.

Figure 4:
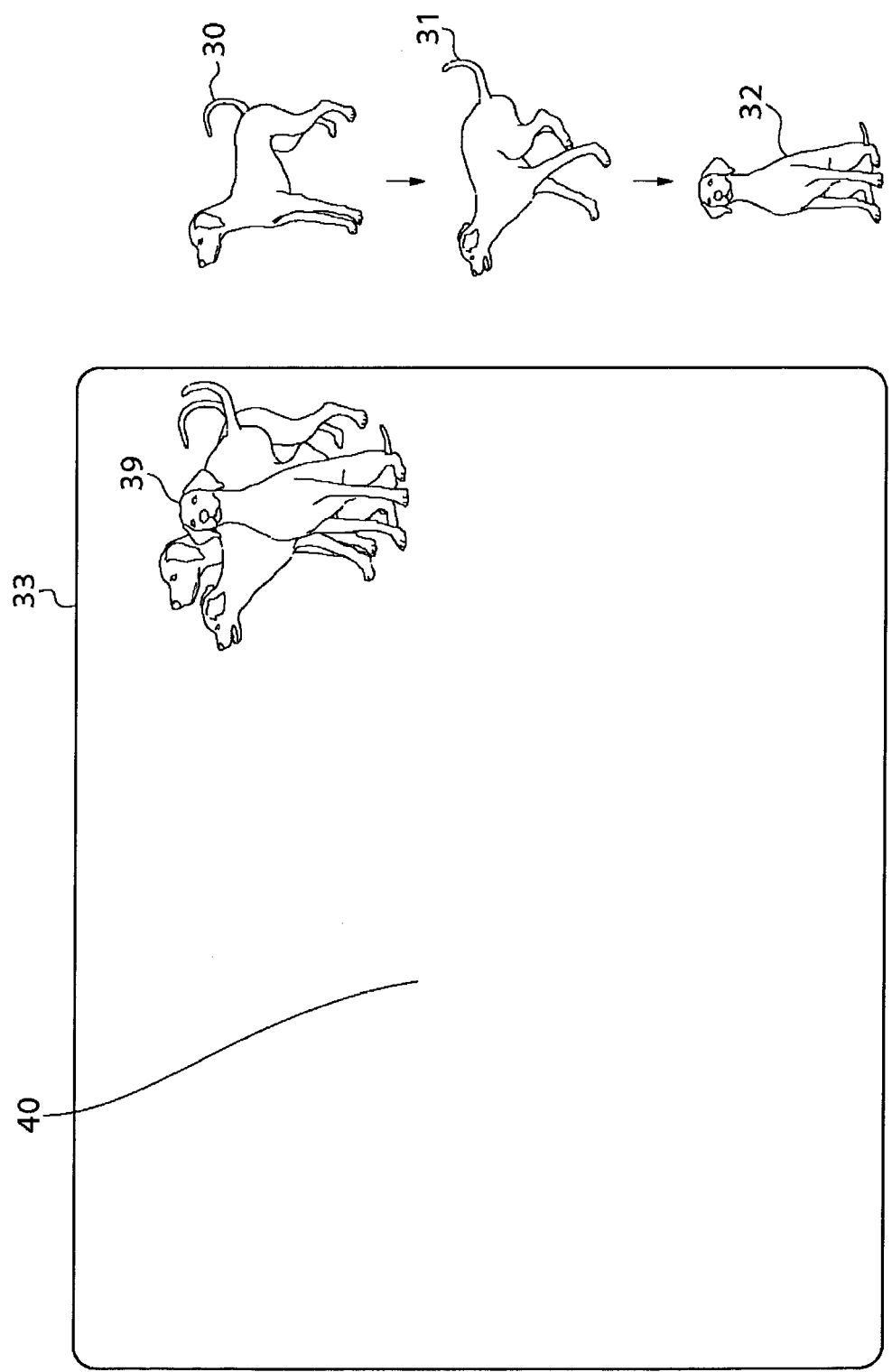
FIG. 4 illustrates a scene containing only separated objects.

However, when a screen saver is created through separating the object, i.e., the dog, from the images, and erasing the backgrounds, problems may arise. FIG. 4 shows a scene containing only the object, i.e., the dog that has been separated. For example, when the scenes containing the object dog that has been separated changes from a scene 30→a scene 31→a scene 32, a moving image 39 of the dog displayed on a screen 33 looks as if the dog is merely moving its legs back and forth on a desk top 40.

Figure 5:
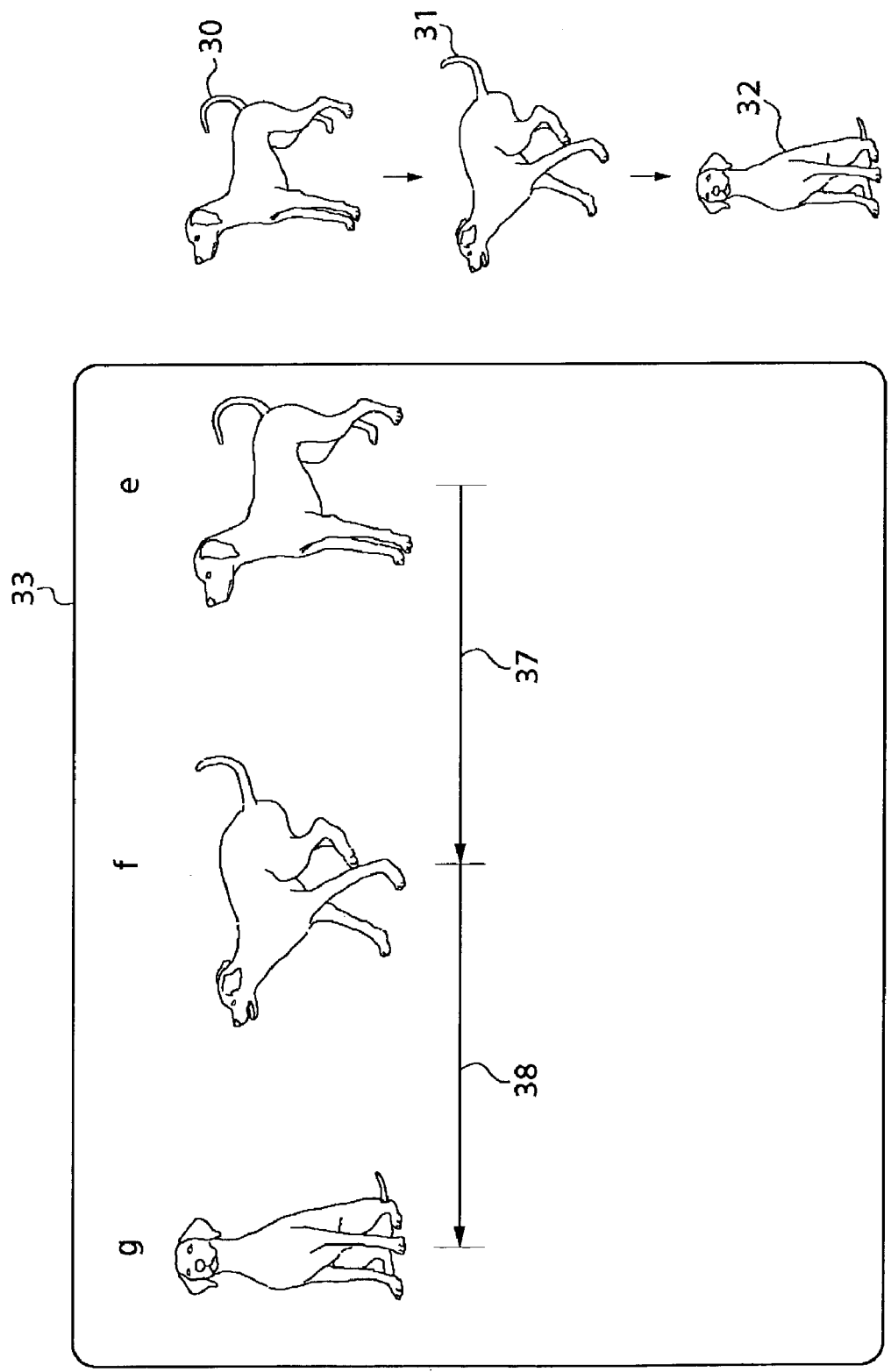
FIG. 5 illustrates a state in which display positions of an object are changed on the screen.

To solve the problem, the display position of the dog on the screen 33 needs to be successively shifted from right to left in each of the frames according to the actual movements of the dog, as indicated at a position e, a position f and a position g in FIG. 5. FIG. 5 shows a state in which the display position of the dog on the screen is successively shifted by a predetermined moving amount between adjacent frames. As a result, the dog appears to be actually walking or running on the desk top 40. Movement amounts 37 and 38 indicated in FIG. 5 are determined based on the moving (running or walking) speed of the dog and the size-reduction rate of the dog on the screen.

[Detection of Moving Amount]

Figure 6:
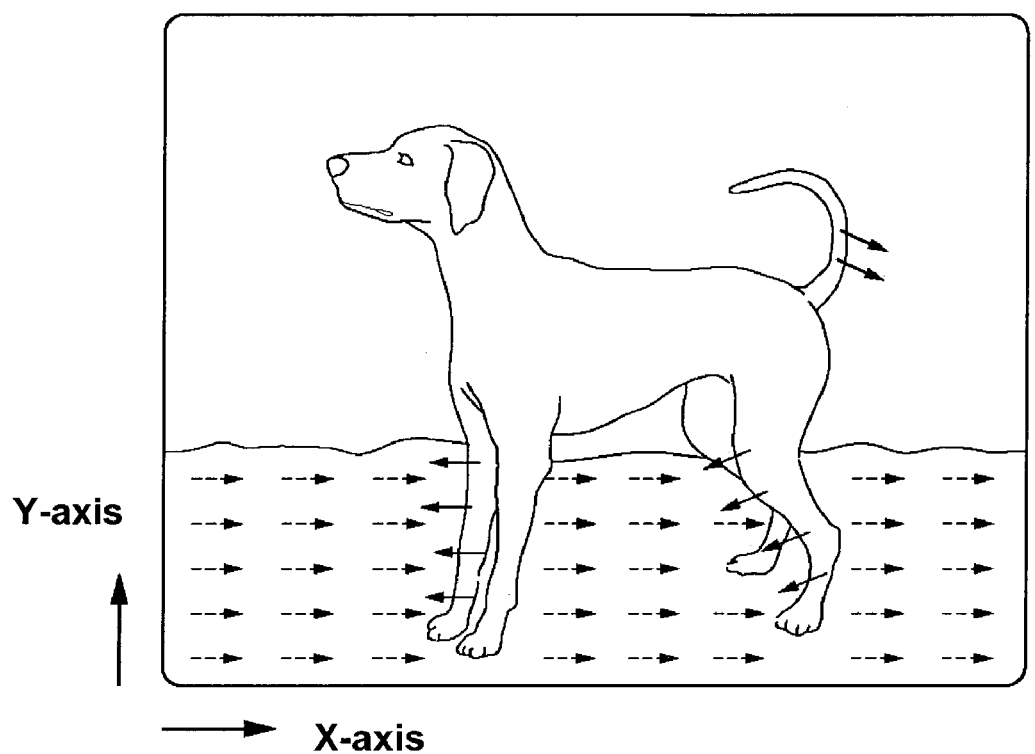
FIG. 6 illustrates a state in which motion vectors are obtained based on differences between two consecutive frames of a scene, and plotted and displayed on the screen.

For detection of moving amounts, a special scheme of MPEG-4 compression method is utilized. The MEPG-4 compression method uses a motion vector coding for compressing image data, in other words, has a so-called a "motion detection" function. FIG. 6 illustrates a state in which motion vectors are obtained based on differences between two consecutive frames of a scene, and plotted and displayed on the screen. The direction of arrows indicates the direction of the motion vectors, and the length of the arrows is proportional to the magnitude of the motion vectors. It is obvious from the figure that moving portions are mostly the backgrounds.

Figure 7:
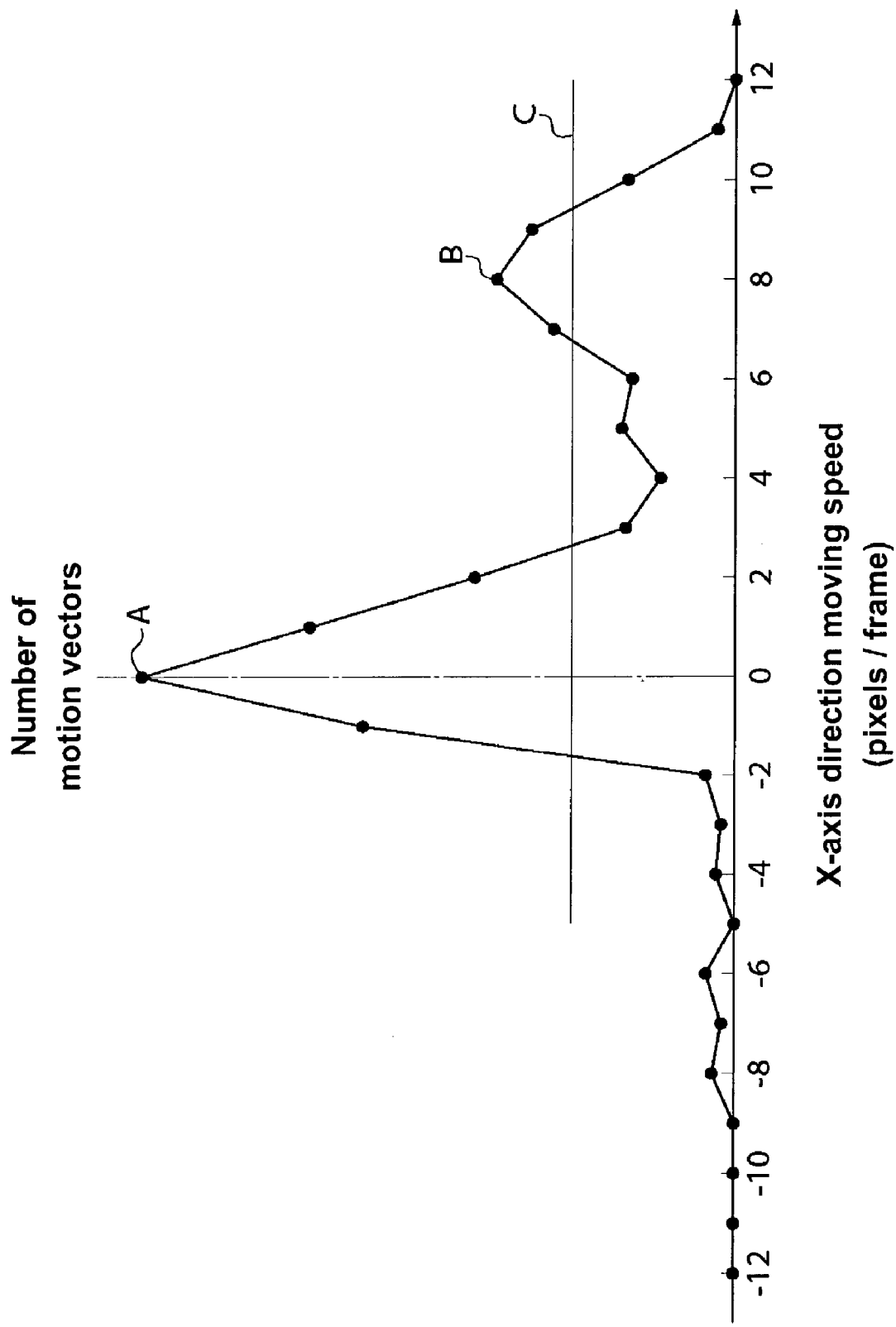
FIG. 7 shows a histogram of x-axis components of motion vectors.
Figure 8:
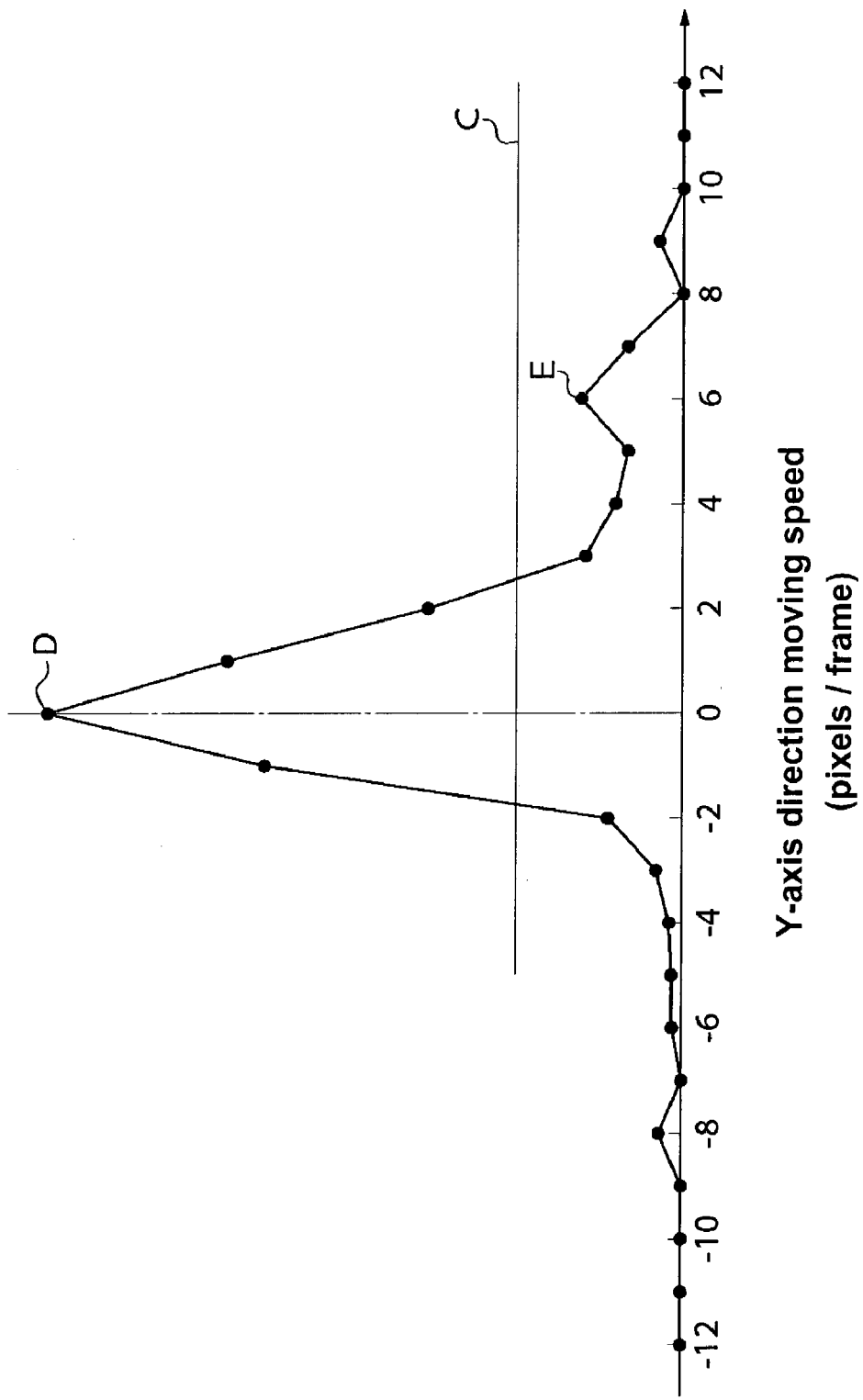
FIG. 8 shows a histogram of y-axis components of motion vectors.

FIG. 7 shows a histogram of x-axis components of the motion vectors. The unit along the vertical axis is the "number" of motion vectors, and the unit along the horizontal axis is a value of "pixels/frame". This histogram shows two peaks A and B. A line indicated by C indicates a slice level for determining peaks. In this histogram, the peak A is caused by motion vectors of portions of the "dog" that has few movements and the "sky" whose light and shade are not clearly defined. Also, the peak B is caused by motion vectors of the background images containing mainly the "grounds and bushes". Accordingly, it is understood from the histogram that the background image of "grounds and bushes" portions are moving to the right direction at a speed of "8 pixels/frame". FIG. 8 shows a histogram of y-axis components of motion vectors. The histogram of FIG. 8 shows only one peak D. Another smaller peak E does not reach the slice level C. Accordingly, it can be determined that there are almost no movement in the Y-axis direction

[Motion Integration]

By detecting moving amounts, movements of an object is calculated. In this example, it is assumed that there is only one object such as a dog existing on the screen.

When a motion vector of the object given across adjacent frames is [p (x, y)], and a motion vectors of the backgrounds across adjacent frames is [b (x, y)], an absolute motion vectors of the object [P (x, y)] is given by Formula (a) as follows:

$$[P](\text{pixels/frame}) = [p] - [b] \ldots \quad (1)$$

When the frame rage of the moving image is F (frames/second), the speed of the object [V (x, y)] is given by Formula (2) as follows:

$$[V](\text{pixels/frame}) = [P] \times F \quad (2)$$

Accordingly, the distance [j] in which the object moves in a minimal time period t is given by Formula (3), and the amount of movement [J] of the object in a predetermined time period T is given by an integral value as indicated in Formula (4) as follows:

$$[j] = [V] \times t \quad (3)$$

$$[J](\text{pixels/T seconds}) = \text{Integral } [V] \times t, \text{ where } t = 0 \text{ to } T \quad (4)$$
$$= \text{Integral } ([p] - [b]) \times F \times t, \text{ where } t = 0 \text{ to } T$$

Figure 9:
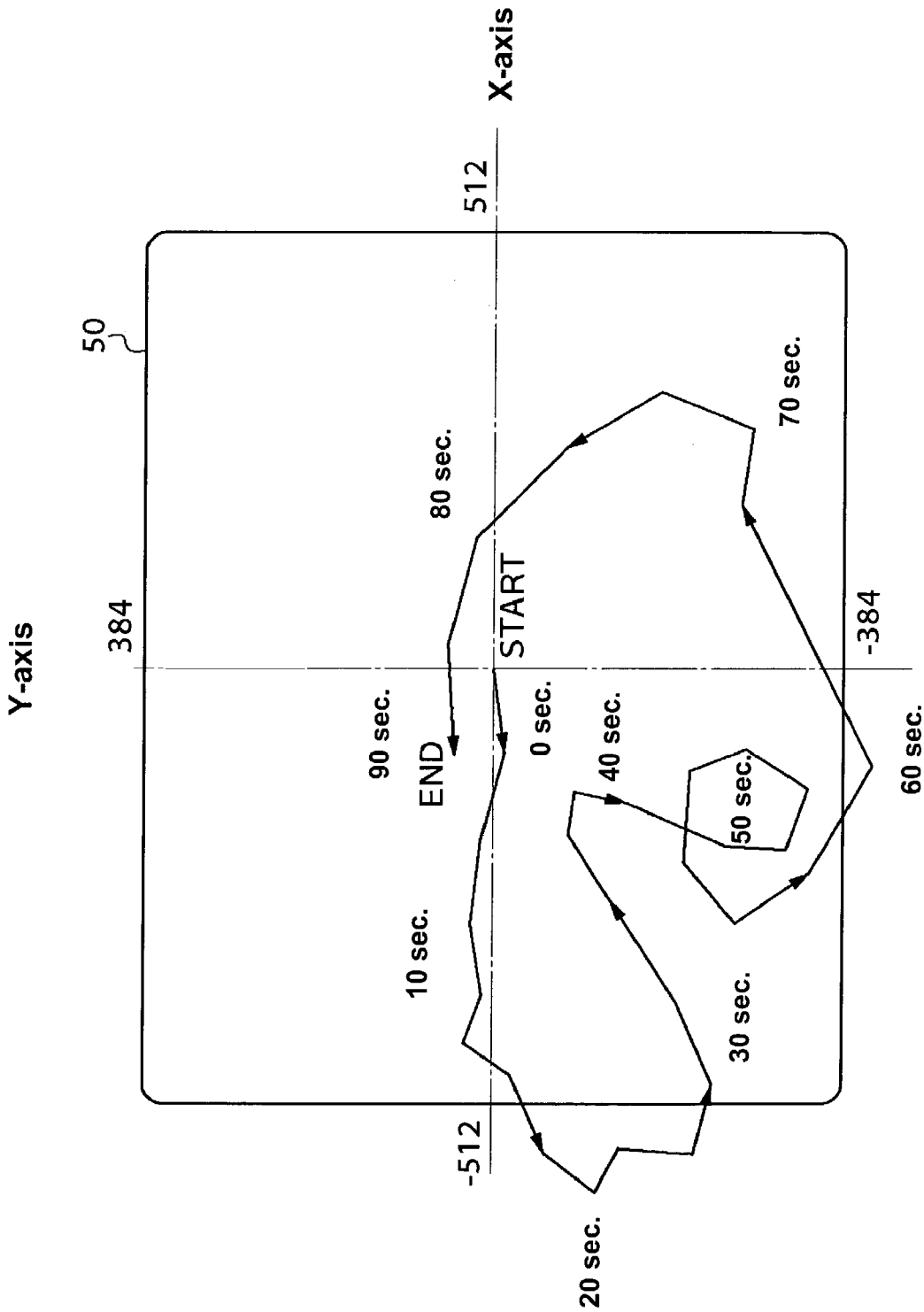
FIG. 9 shows a graph indicating a locus of values of moving amounts J plotted every one second on the screen.

FIG. 9 shows a graph indicating a locus of values of moving amounts J plotted every one second on a screen 50. The locus of moving amounts J is assumed to be similar to a locus of the object that moved around a certain area, for example a locus of a dog that walked around a park. The dog starts at an original point (0, 0), and reached at an END point in 90 seconds. The graph shown in FIG. 9 is called here a locus vector graph. The screen 50 may be, for example, a XGA size (1024×768).

Figure 10:
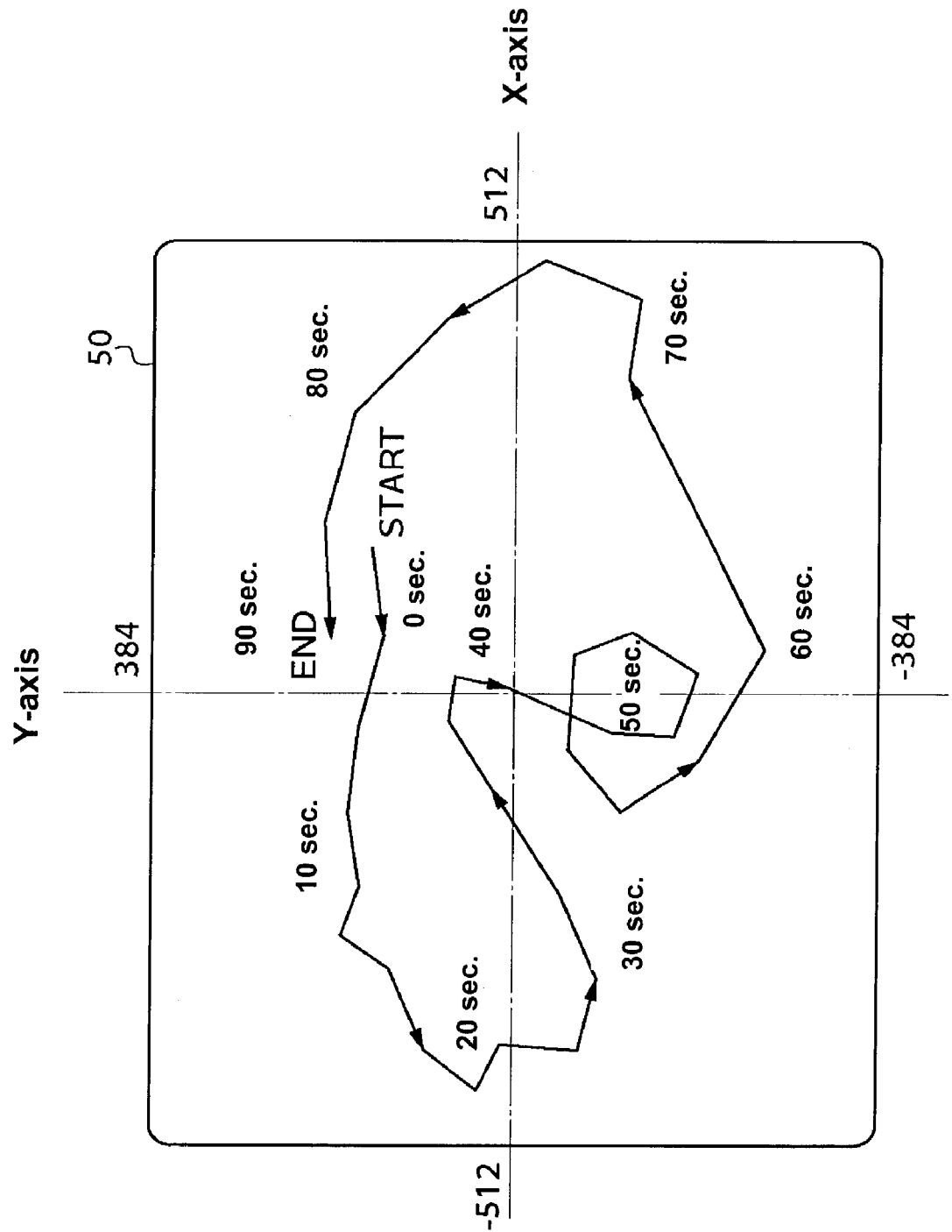
FIG. 10 shows a locus of a moving object that is shifted such that the locus is contained within the screen 50.

Since the locus of movements of the dog in FIG. 9 that partially sticks out of the screen 50 is not desirable, the entire locus of movements of the dog is shifted such that the entire locus is contained inside the screen as indicated in FIG. 10. FIG. 10 shows the locus of movements of the dog which has been shifted such that the entire locus is contained within the screen 50. The locus may be reduced in size to be fitted within the screen. If the size-reduction ratio is within about 20%, there would be no problem in changing the locus vector alone. However, when the size-reduction ratio exceeds over 20%, the object dog in a created screen saver may appear to be merely sliding or slipping on the ground. Therefore in this case, the moving image of the object also needs to be reduced along with the reduction of the locus vector. The method of reducing the moving image of the object may often be practically applied up to about 40% size-reduction ratio of the locus vector. For greater reduction ratios, the object in the moving image becomes extremely small, and an alternative method may be required.

[Protrusion of Locus]

Ordinarily, while an individual is capturing a video image of his/her own pet dog with a video camera, he/she may be only concerned with capturing fine moments in the movements of his/her pet dog, and does not pay attention to whether the dog, as an object in a created screen saver, moves out of the screen. For this reason, when motion vectors of the captured video image are analyzed and a locus vector graph is drawn, the locus vector graph often largely sticks out of the screen. In this case, if the locus vector graph is still not contained within the screen even after it has been reduced by about 40%, the locus vector graph may be left sticking out of the screen because the motion of the object dog on the screen may look natural by allowing the locus vector graph left sticking out of the screen in such a case.

Figure 11:
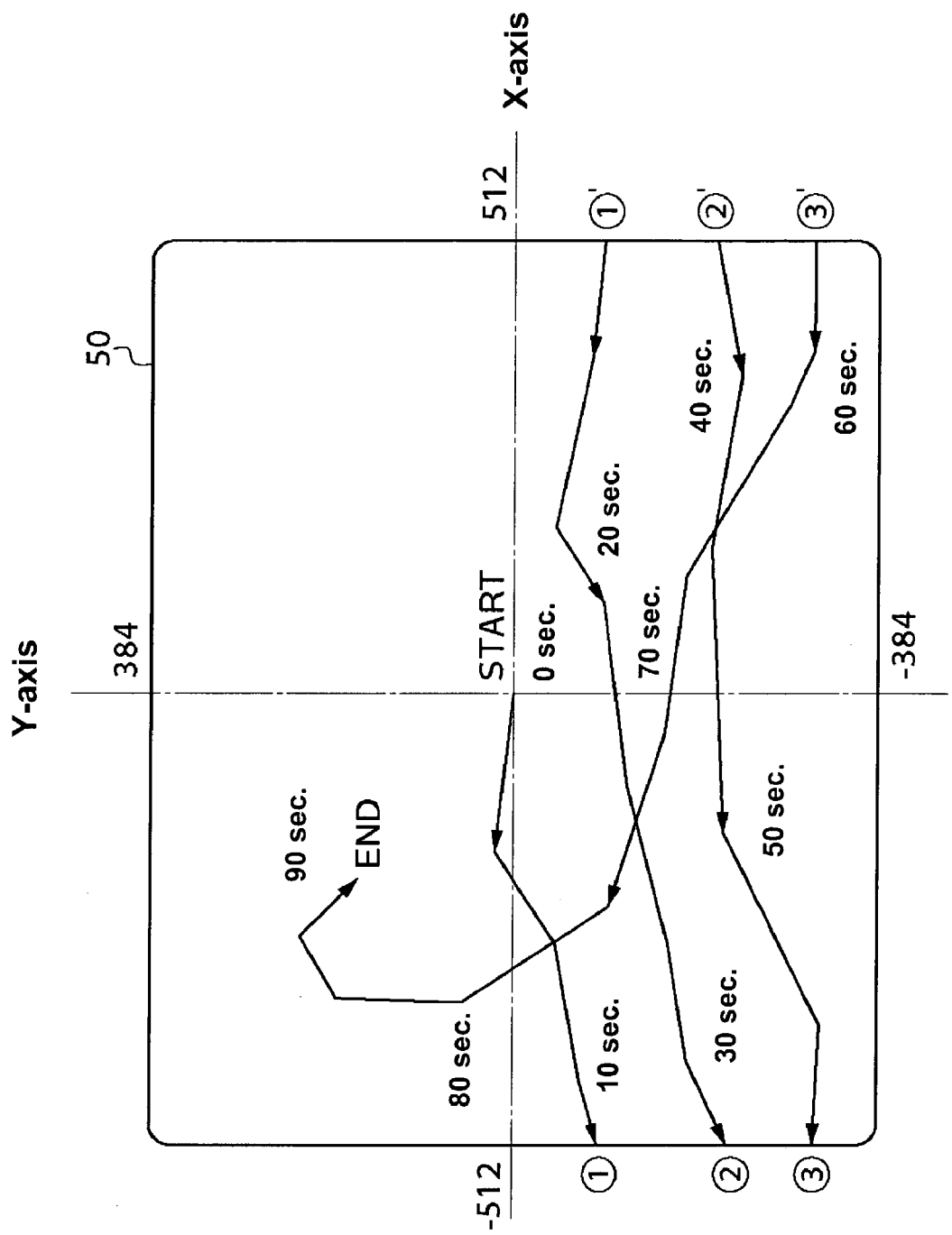
FIG. 11 illustrates a state in which a locus vector diagram is extended outside the screen.

FIG. 11 shows an example state in which a locus vector graph is left sticking out of the screen. As indicated in the figure, a moving object, i.e., a dog in this example, moves to the left from a starting point START, and its locus vector graph reaches as much as 400% compared to the screen size. This may be resulted most probably from the fact that the dog continued moving around the photographer counter-clockwise. Accordingly, since the object size can be kept at 100%, a better visual effect may be achieved if the dog in the screen saver moves out of the screen at point ①, enters the screen at point ①', moves out of the screen at point ②, enters the screen at point ②', moves out of the screen at point ③, enters the screen at point ③', and ends its movement at an end point END.

[Structure of Encoder Section]

Figure 12:
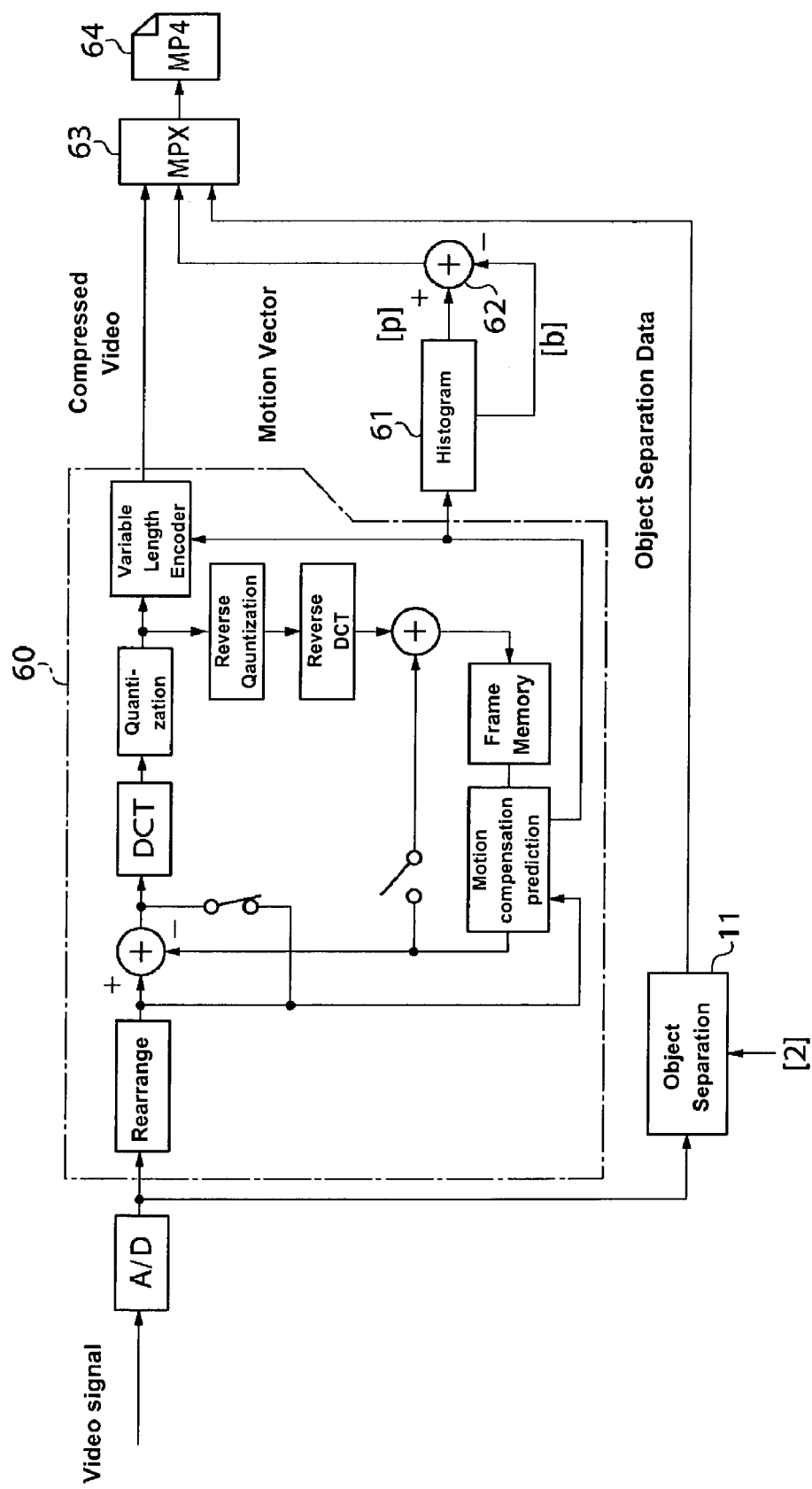
FIG. 12 shows a block diagram of a structure of an encoder in a personal computer (client) 3.

FIG. 12 shows a block diagram of a structure of an encoder section within the personal computer (client) 3. A portion surrounded by a dot and dash line in the figure is a motion compensation DCT encoding section 60, which is a known technology to the person skilled in the art.

An object separation module 11 judges images in parallel with the motion compensation DCT encoding section 60. A numerical value "2" inputted in the object separation module 11 is, as described above, data for selecting a separation method (i.e., separation procedure selection parameter). The object separation data is made up of binary data of "0" and "1" and therefore outputted after it has been subject to Modified Huffman (MH) coding.

Motion compensation prediction data handled by the motion compensation DCT encoding section 60 is also sent to a histogram circuit 61, where the histogram is totalized in each frame. As a result, two peaks A and B are calculated, and a difference between the peak A that is close to the base point (the motion vector of the object between adjacent frames [p]) and the peak B that is far from the base point (the motion vector of the background images) is calculated by an adder 62. The calculation result equals to the result indicated by Formula 1. The calculation result, together with the compressed video signal and the object separation data, is multiplexed by a multiplexer (MPX) 63 and outputted as a MPEG-4 file 64.

Figure 13:
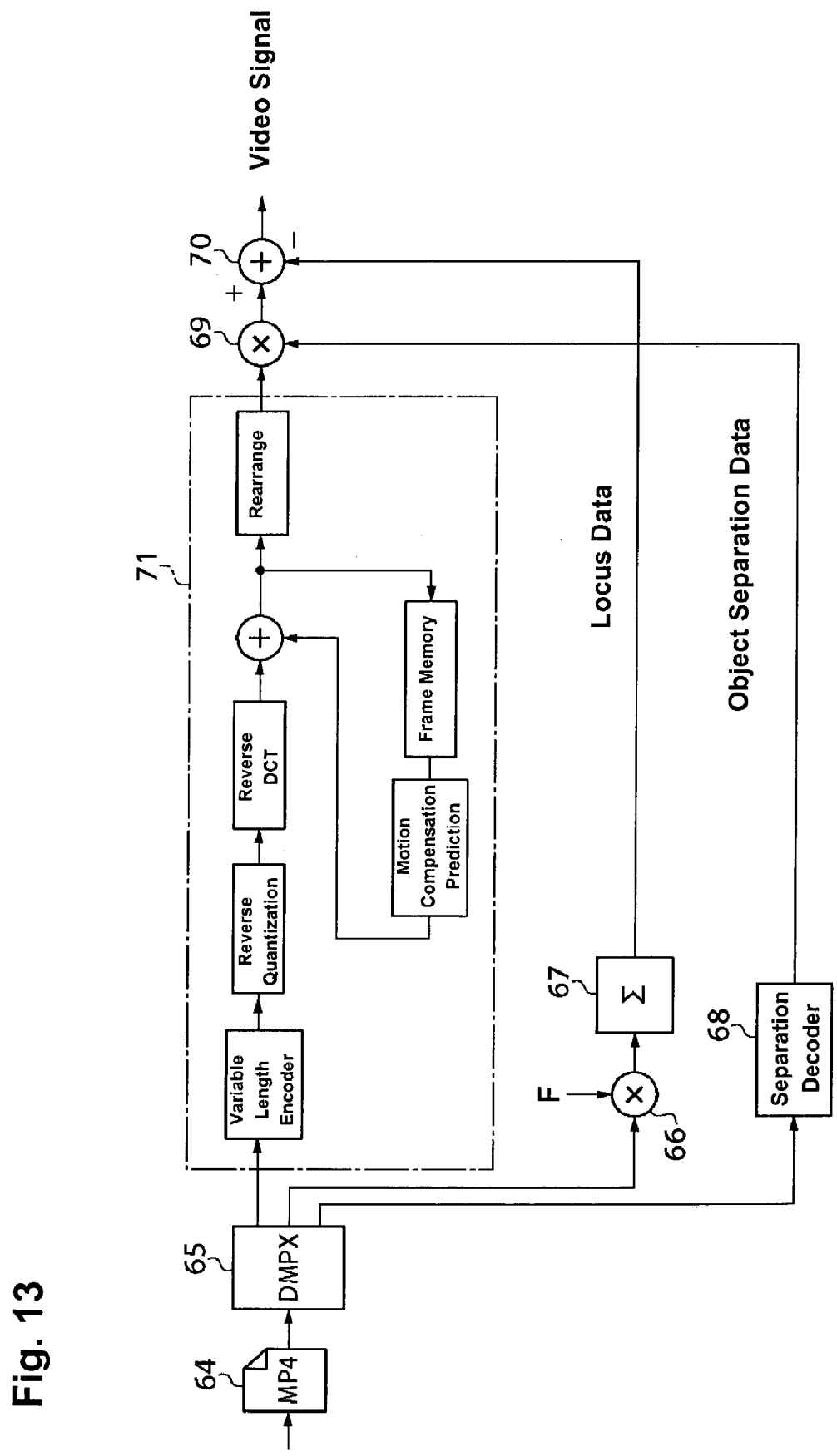
FIG. 13 shows a block diagram of a structure of a decoder section within a server 5.

FIG. 13 shows a block diagram of a structure of a decoder section within the server 5. A portion surrounded by a dash and dot line is a motion compensation DCT decoding section 71, which is a known technology to the person skilled in the art. The MPEG-4 file 64 is separated by a demultiplexer (DMPX) 65 into the compressed video signal, the motion compensation DCT decoding signal, and the object separation data. The object separation data is inputted in a separation decoder 68. The separation decoder 68 outputs an image in binary values, which is multiplied by a multiplier 69 with a reproduced video signal that is outputted from the motion compensation DCT decoding section 71. The background images are discarded here.

In the meantime, the motion compensation DCT decoding signal is multiplied by a multiplier 66 with a fixed value F, and the result is inputted in an integrator 67. The integrator 67 outputs moving amount data for the object, which is indicated in Formula 4. The moving amount data is locus data, and is added to the object video signal by an adder 70, to provide offset values. It is noted that the multiplier 66 and the integrator 67 may be provided on the encoder side shown in FIG. 12. In this case, the locus data itself would be stored in the MPEG-4 file 64.

[Operations as Screen Saver]

When the object video signal (moving image) thus created is replayed to provide the object with predetermined motions, a program that is to be given to BIFS (Binary Format for Scene) needs to be decided. BIFS, which is standardized with ISO/IEC 14496-1, is a binary code, but is functionally the same as VRML (Virtual Reality Modeling Language) that is a text base, and supports Java® script.

[VRML/BIFS]

A program described below is an example of a VRML program for changing the position of the moving image object (the dog in this embodiment) that has been separated on the screen according to the locus along which the dog walked while the moving image is replayed:

```
#VRML V2.0 utf8
Group [ children [
    DEF PI PositionInterpolator [
        Key [0.0, .1, .4, .7, .9, 1.0]
        KeyValue [-3 0 0, 0 0 0, 0 20 -50, 0 0 -100, 0 0 0, -3 0 0] ]
    Shape [
        Appearance Appearance [
            Texture DEF MT1 MovieTexture [
                uri "MyDog.mp4"
                loop FALSE
            ]
        ]
        geometry Box [
            size 320 220 1
        ]
    ]
    DEF TS1 TouchSensor [ ]
    DEF TS TimeSensor [cycleInterval 10.0 ]
    Background [desktop 1 1 1 ]
] ]
ROUTE PI.value#changed TO T.translation
ROUTE TS1.touchTime TO MT1.startTime
ROUTE TS.fraction#changed TO PI.set#fraction
```

Figure 14:
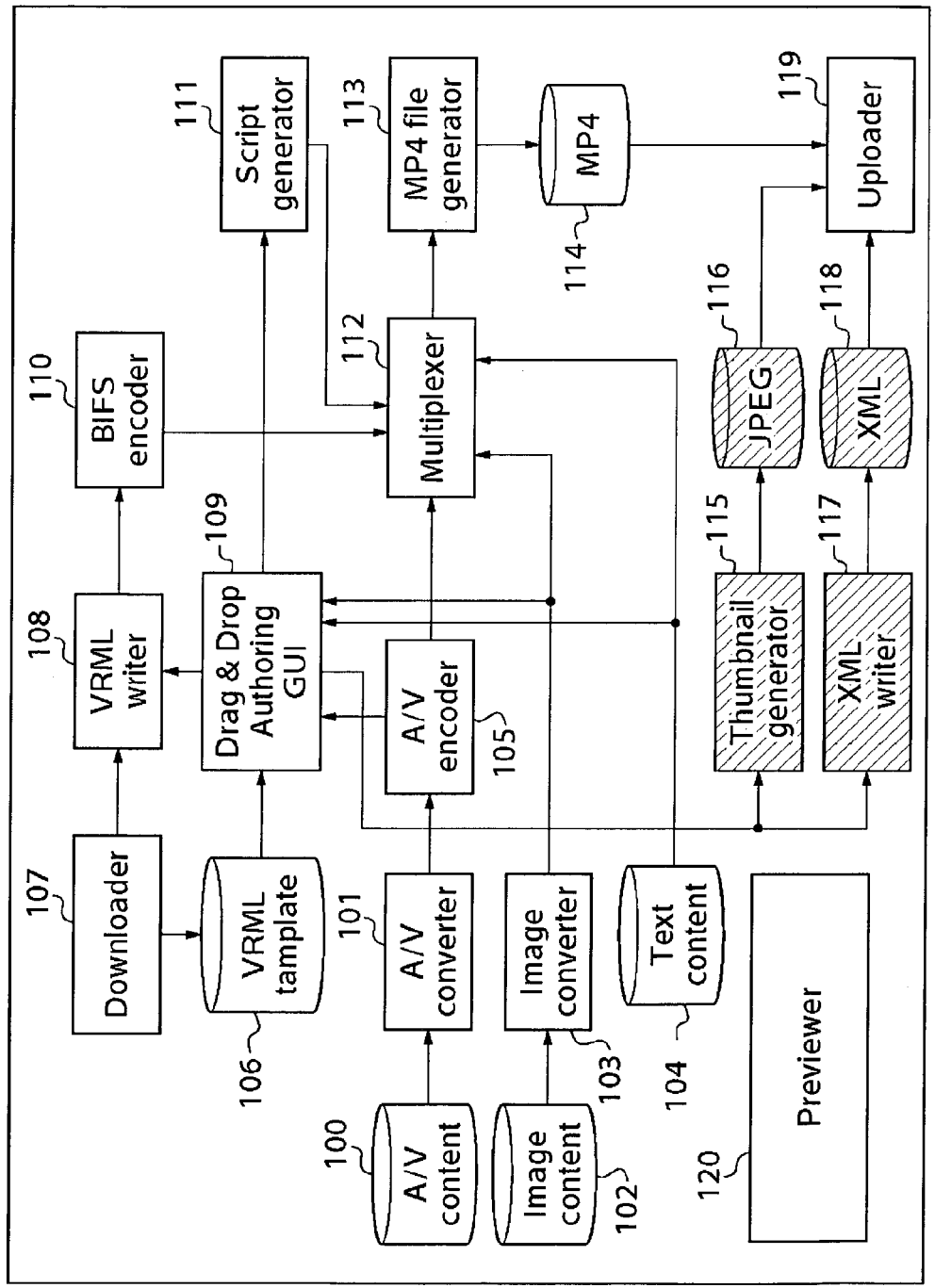
FIG. 14 shows a functional block diagram of an encoder section that creates a screen saver.
Figure 12:
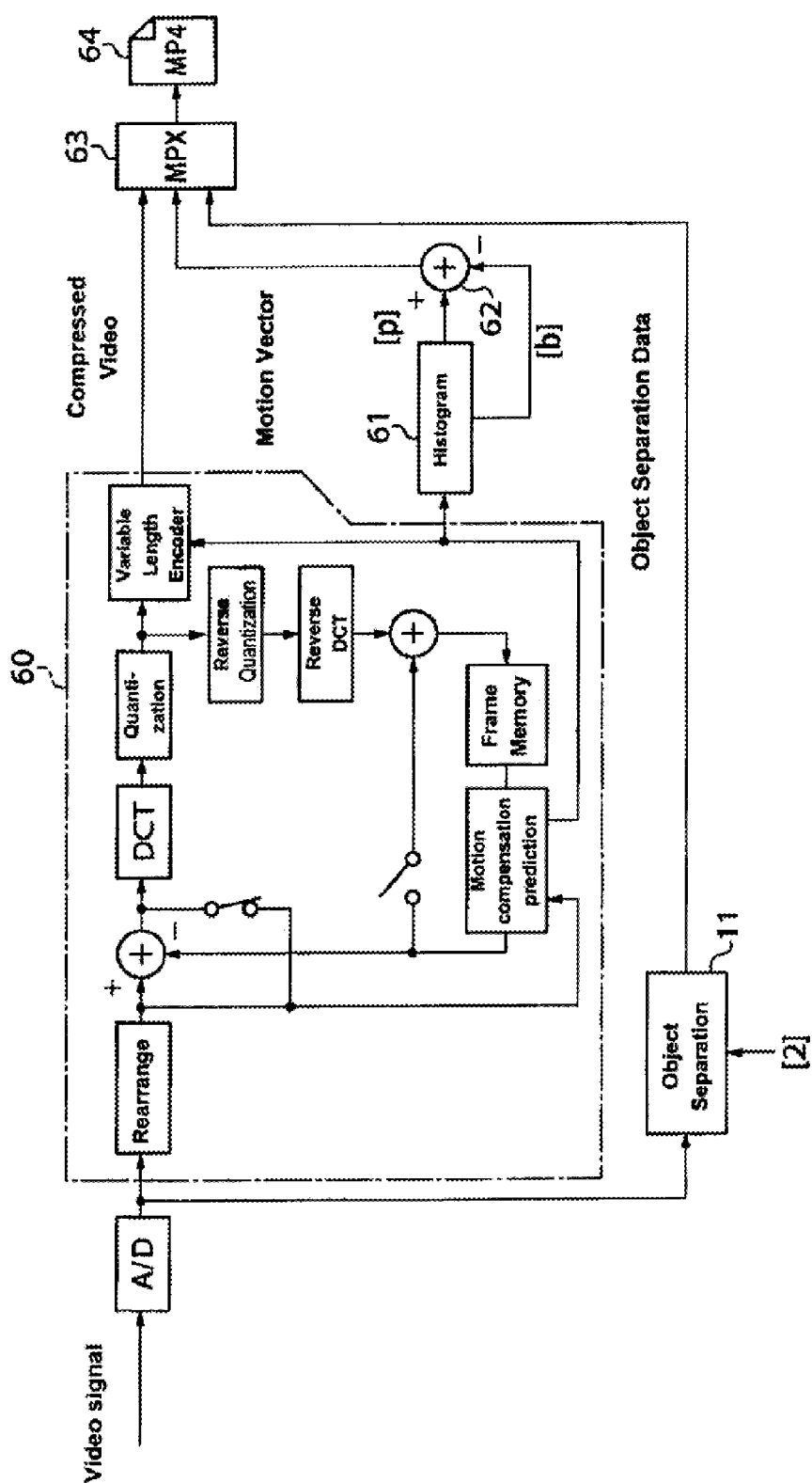
Figure 14:
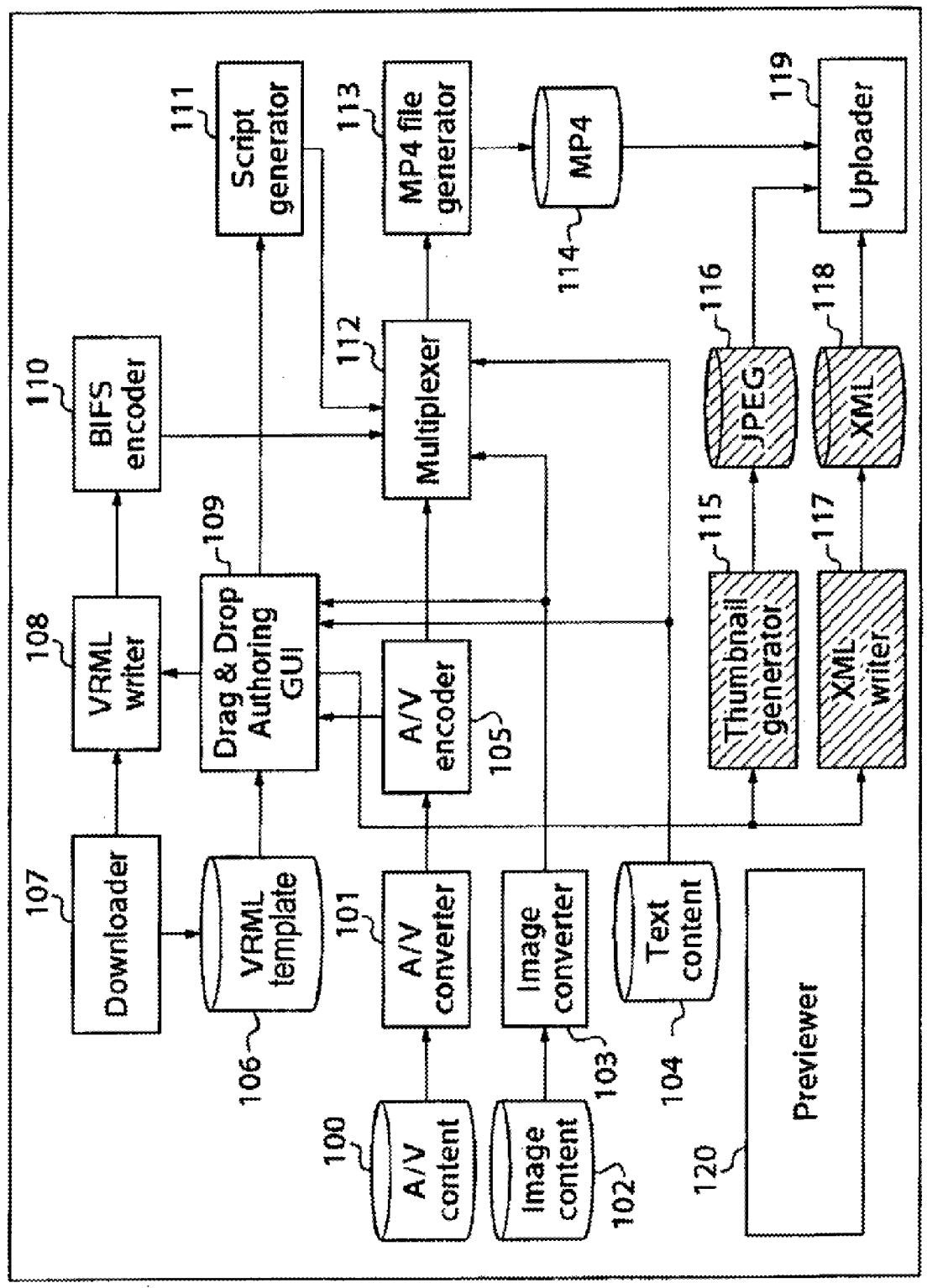

FIG. 14 shows a functional block diagram of an encoder section that creates a screen saver. Moving image contents (A/V contents) 100 are format converted by an A/V converter 101, and further converted into MPG-4 format by an A/V encoder 105. In the meantime, still image contents (image contents) 102 are compressed in JPEG format by a background still image encoder 103, and provided to a layout editor tool (Drag & drop authoring GUI) 109 as multimedia material.

When a template file that has a predetermined layout is downloaded from a Web server, a VRML template is downloaded through a downloader 107. As the multimedia material is drag & dropped on the template, the layout editor tool 109 outputs a screen saver layout in VRML format to a VRML encoder (VRML write) 108, and converts the screen saver layout in VRML format by a BIFS encoder 110 into a BIFS layout in a binary format.

The resultant BIFS layout is multiplexed, together with the moving image, still image and texts by a multiplexer 112. A script that describes the is procedure described above is given from a multiplex control script generation tool (Script generator) 111.

The multiplexed result is converted by a file I/O module 113 into a MP4 file, and stored in a disk 114.

The MP4 file stored in the disk 114 can be locally replayed by a preview tool (Previewer) 120. Ordinarily, a thumbnail generation module (Thumbnail generator) 115 generates a thumbnail image in the form of an icon for the MP4 file and stores the thumbnail image in a disk 116, and a contents description file generation module 117 (XML writer) generates format items and stores the same in a disk 118. A communications module (Uploader) 119 can upload the contents stored in the disks 114, 116 and 118 to a server (not shown) for publication to Web servers.

On the replay side, a module that may be the same as the preview tool 120 may be started in the background, so that the contents distributed are started when an input device such as a mouse, keyboard or the like is not operated for a predetermined time period.

As described above, by the screen saver creating system in accordance with the embodiment of the present invention, since the server 5 performs the complex creation work, the user can readily create screen savers that display video images captured by the user him/herself.

Also, even when a moving object such as a pet animal is zoomed up in a video camera to a size that fills almost the entire display screen, and the video camera 2 is panned to follow movements of the object, the display position of the moving object can be moved within the display screen according to the movements of the object. Therefore, for example, artificial presentation of scenes, such as a running dog or cat merely moving its legs while staying in one spot, can be avoided.

In the above description, an embodiment of the present invention is described. However, the present invention is not limited to these embodiments, and many modifications can be made.

For example, in the embodiment described above, the present invention is applied to a client/server system in which an MPEG-4 file is uploaded from a client to a server, a screen saver is created by the server and stored, and the screen saver is download and installed on the client. However, the operations performed by the client and server can be realized by a single apparatus that is not connected a network.

Also, the screen saver creating system in accordance with the embodiment of the present invention may be applied to business that distributes screen savers for payment.

Moreover, in the embodiment described above, the present invention is applied to the case where screen savers are created. In addition, the present invention is also applicable to other cases where a server may be used to create other applications as environment software for automatic display of moving image mails, automatic reception of moving image publication, automatic reception of registered programs, moving image help for applications.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system for creating screen savers based on video image, the system comprising:
   a first transmission module that transmits the video image;
   an image separation module that receives the video image transmitted and separates an object image from the video image received;

an obtaining module that obtains moving speed and moving direction of the object image;

a screen saver creating module that creates a screen saver using the object image separated as contents, wherein the screen saver creating module creates a screen saver based on the moving speed and direction obtained, and the screen saver created moves a display position of the object image to be displayed based on the moving speed and direction;

a second transmission module that transmits the screen saver created;

a start module that receives and starts the screen saver transmitted; and a displaying module that displays the screen saver when the start module receives and starts the screen saver.

2. A system for creating screen savers according to claim 1, further comprising a server and a client connected through a network, wherein the client includes the first transmission module and the start module, and the server includes the image separation module, the screen saver creating module and the second transmission module.

3. A system for creating screen savers according to claim 1, further comprising a storage module that stores a plurality of image separation procedures for separating the object image.

4. A system for creating screen savers according to claim 3, further comprising a separation module that selects one of the plurality of image separation procedures for separating the object image.

5. A system for creating screen savers according to claim 1, further comprising a separation module that selects an image separation procedure for separating the object image.

6. A system for creating screen savers according to claim 1, further comprising a format conversion module that converts the video image into a file compressed in MPEG-4 format, wherein the first transmission module transmits the file compressed in MPEG-4 format.

7. A method for creating screen savers based on video image, the method comprising:

a first transmission step of transmitting the video image;

an image separation step of receiving the video image transmitted and separating an object image from the video image received;

an obtaining step of obtaining moving speed and moving direction of the object image;

a screen saver creating step of creating a screen saver using the object image separated as contents, wherein the screen saver creating step includes creating a screen saver based on the moving speed and direction obtained, and the screen saver created moves a display position of the object image to be displayed based on the moving speed and direction;

a second transmission step of transmitting the screen saver created;

a start step of receiving and starting the screen saver transmitted; and a display step of displaying the screen saver when the screen saver is received and started in the start step.

8. A method for creating screen savers according to claim 7, further comprising a storing step of storing a plurality of image separation procedures for separating the object image.

9. A method for creating screen savers according to claim 8, further comprising a separation step of selecting one of the plurality of image separation procedures for separating the object image.

10. A method for creating screen savers according to claim 7, wherein the image separation step includes selecting an image separation procedure for separating the object image.

11. A method for creating screen savers according to claim 7, further comprising a format conversion step of converting the video image into a file compressed in MPEG-4 format, wherein the first transmission step includes transmitting the file compressed in MPEG-4 format.

12. A method for creating screen savers based on multimedia material including at least video image, the method comprising:

a first transmission step of transmitting the at least video image;

a preserving step of receiving the at least video image transmitted and preserving layout information of the at least video image transmitted placed in a two-dimensional layout;

a time controlling step of providing the layout information with changes along a time axis, and controlling and preserving parameters that control display position, display mode, and display timing of the multimedia material;

an image separation step of separating an object image from the video image;

an obtaining step of obtaining moving speed and moving direction of the object image;

a screen saver creating step of controlling position information along the time axis of the object image separated and superposing the object image with another object thereby to create a screen saver, wherein the screen saver creating step includes creating a screen saver based on the moving speed and direction obtained, and the screen saver created moves a display position of the object image to be displayed based on the moving speed and direction;

a second transmission step of transmitting the screen saver created;

a start step of receiving and starting the screen saver transmitted; and a display step of displaying the screen saver when the screen saver is received and started in the start step.

13. A method for creating screen savers according to claim 12, wherein the multimedia material further includes at least one of a still image and a computer graphic (CG).

14. A method for creating screen savers according to claim 12, wherein the preserving step includes mixing the video image of the multimedia material with another multimedia material to create layout information in which the multimedia materials mixed are arranged in a two-dimensional layout.

15. A method for creating screen savers according to claim 14, wherein the time controlling step includes controlling and preserving a parameter that controls a superposed state of the multimedia materials mixed.

* * * * *

UNITED STATES PATENT AND TRADEMARK OFFICE
CERTIFICATE OF CORRECTION

| | |
|---|---|
| PATENT NO. | : 7,194,703 B2 |
| APPLICATION NO. | : 10/449624 |
| DATED | : March 20, 2007 |
| INVENTOR(S) | : Yoshikazu Yokomizo |

It is certified that error appears in the above-identified patent and that said Letters Patent is hereby corrected as shown below:

SHEET 12

Fig. 12, "Qauntization" should read --Quantization--. As shown in attached.

SHEET 14

Fig. 14, "tamplate" should read --template--. As shown in attached.

COLUMN 2

Line 43, "controls" should read --control--.

COLUMN 3

Line 55, "air plane," should read --airplane,--.

COLUMN 6

Line 15, "changes" should read --change--.
    Line 62, "movement" should read --movements--; and "direction" should read -- direction.--.
    Line 65, "is" should read --are--.

COLUMN 7

Line 2, "vectors" should read --vector--.
    Line 4, "vectors" should read --vector--.
    Line 6, "[p/-[b]..." should read --[p]-[b]...--.
    Line 7, "rage" should read --rate--.
    Line 11, "[P/xF" should read --[P]xF--.
    Line 31, "at" (second occurrence) should be deleted.

COLUMN 8

Line 8, "be resulted" should read --resulted--.
    Line 39, "to" should be deleted.

UNITED STATES PATENT AND TRADEMARK OFFICE
CERTIFICATE OF CORRECTION

PATENT NO.        : 7,194,703 B2
APPLICATION NO.   : 10/449624
DATED             : March 20, 2007
INVENTOR(S)       : Yoshikazu Yokomizo It is certified that error appears in the above-identified patent and that said Letters Patent is hereby corrected as shown below:

COLUMN 9

Line 57, "is" (first occurrence) should be deleted.

COLUMN 10

Line 33, "download" should read --downloaded--.

Signed and Sealed this

Twenty-ninth Day of January, 2008

JON W. DUDAS
*Director of the United States Patent and Trademark Office*